No. 801,774. PATENTED OCT. 10, 1905.
T. E. DEVONSHIRE.
CONDUIT FOR ELECTRIC CABLES OR CONDUCTORS.
APPLICATION FILED NOV. 5, 1904.
2 SHEETS—SHEET 1.
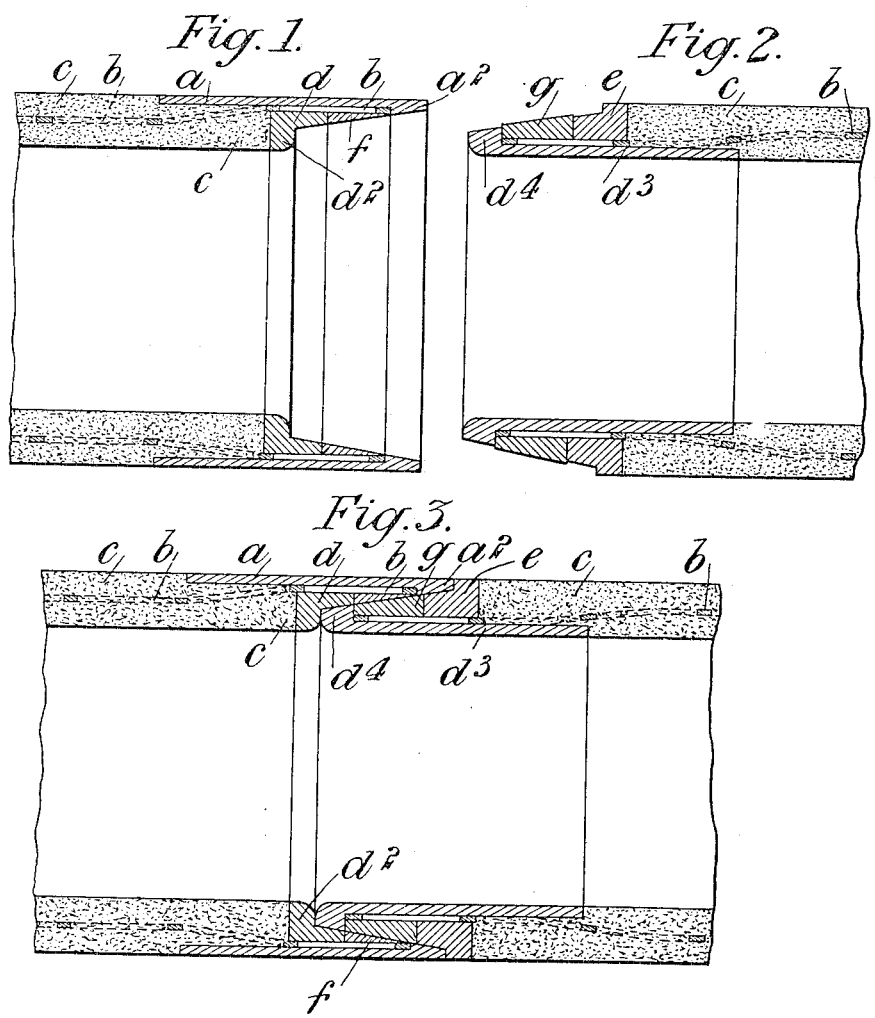
WITNESSES
Edna W. Collins
Walter Abbr
INVENTOR
Thomas Easton Devonshire
BY
Howson and Howson
ATTORNEYS

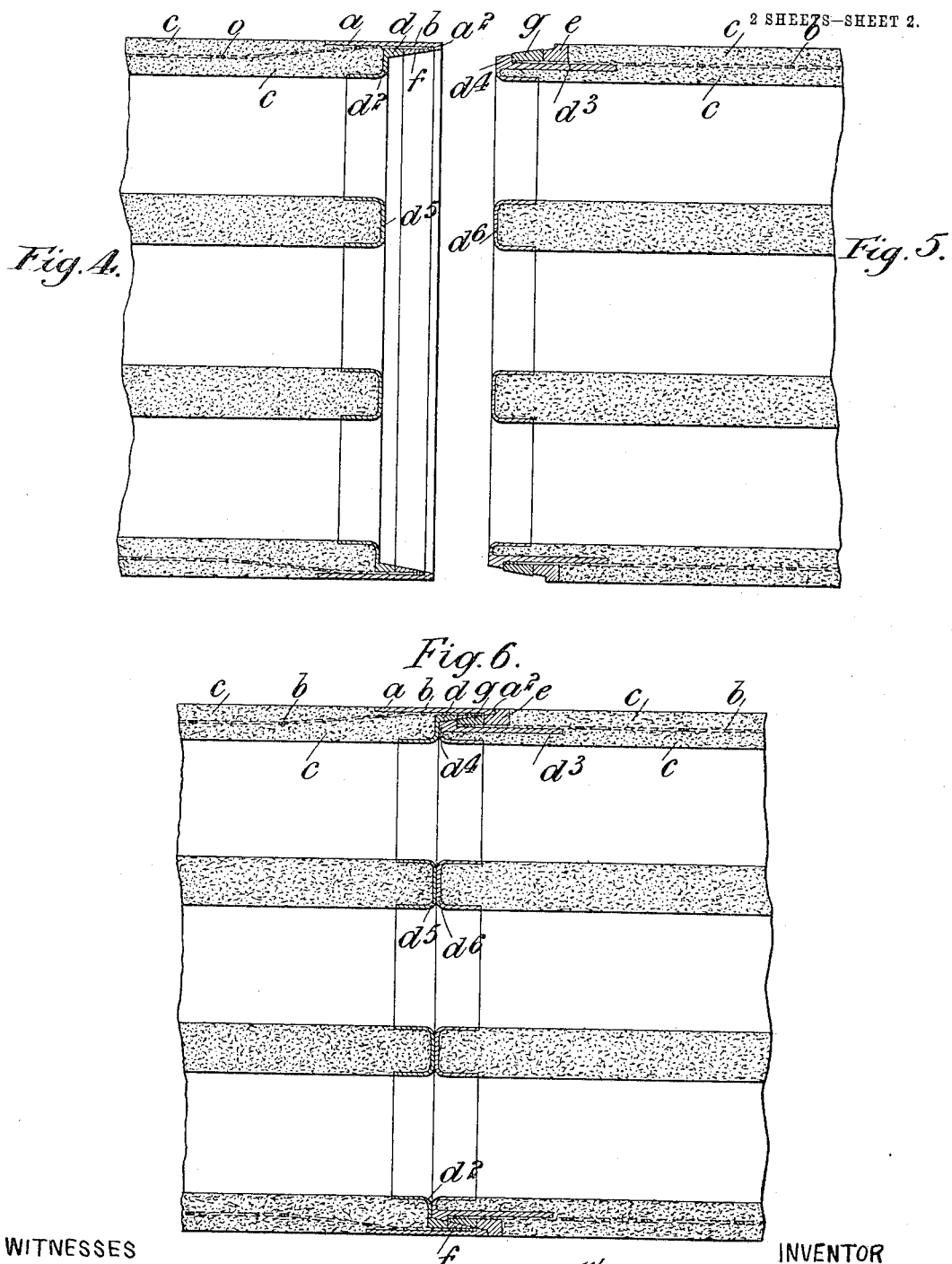

UNITED STATES PATENT OFFICE.

THOMAS EASTON DEVONSHIRE, OF LONDON, ENGLAND.

CONDUIT FOR ELECTRIC CABLES OR CONDUCTORS.

No. 801,774.     Specification of Letters Patent.     Patented Oct. 10, 1905.

Application filed November 5, 1904. Serial No. 231,522.

*To all whom it may concern:*

Be it known that I, THOMAS EASTON DEVONSHIRE, civil engineer, a subject of the King of Great Britain and Ireland, residing at Suffolk House, Laurence Pountney Hill, in the city of London, England, have invented new and useful Improvements in Conduits for Electric Cables or Conductors, of which the following is a specification.

My invention relates to conduits for electric cables or conductors, the said conduits being of the type in which perforated or reticulated metal or metal in analogous form, such as the form known as "expanded" metal, is combined with cement-mortar or concrete or the like; and the object of my invention is to make the length of which the conduits are formed so that while they have great strength and durability and can be economically and quickly made they are protected against injury at angles or edges and the joints of the said lengths offer no obstruction to the drawing of the cables through the conduits. In the construction according to my invention the edges, which would otherwise be liable to injury, are protected by metal, and at each end of the lengths the ducts terminate in an internal metal end piece or ferrule, so shaped, as hereinafter described, as to prevent any obstruction being presented to the drawing of the cables through the conduits. For simplicity of description I will refer to the perforated, reticulated, or like metal as "expanded" metal, and I will refer to the cement-mortar or concrete or the like as "cement," it being understood that in these expressions I include all descriptions of the respective materials which can be used. The surfaces of the adjacent lengths of conduit are preferably made with the intervention of metal, such as lead, which is in contact with the expanded metal at the adjacent ends of the lengths of conduit, so that there is metallic continuity throughout the conduit, and an "earth-sheath" is thereby formed to protect the cables or conductors in the conduit from extraneous currents.

In the accompanying drawings, Figure 1 shows the spigot end. Fig. 2 shows the socket end separated. Fig. 3 shows the two joined together, and Figs. 4, 5, and 6 are like views showing the invention applied to a multiple-way conduit.

Referring to Figs. 1, 2, and 3, the exterior of the socket end is covered by a metal casing, as shown at $a$, whose outer edge may be made plain, as shown, or be made to overlap the outer edge of the socket, as at $a^2$ in Fig. 1, to protect it. The expanded metal $b$, which strengthens the cement $c$, extends from the opposite end of the length (namely, the spigot end) and abuts against the metal casing $a$. Inward of the socket and inside the conduit end is the metal end piece or ferrule $d$, with an outwardly-curved outward part, as shown at $d^2$. The spigot end is provided with a similar metal end piece or ferrule $d^3$, with an outwardly-curved outer part $d^4$, covering the outer edge of the metal ring $g$ of the spigot end. The joint may be made perfect by coating the meeting surfaces of the spigot and socket, or both, with cement or pitch or the like.

At the socket end the metal casing $a$ may overlap the edge, as shown at $a^2$, and the end portion of the expanded metal is confined between it and the interior metal end piece or ferrule $d$, which has a rounded edge at $d^2$. At the spigot end the end of the expanded metal $b$ is confined between the metal end piece or ferrule $d^3$ (with the outwardly-curved outer part $d^4$) and the metal ring $e$, which is recessed to receive the edge of the socket and make a flush exterior to the conduit at the exterior of the joints.

Between the outer end of the metal end piece or ferrule $d$ at the socket end and the overlapping edge $a^2$ is inserted an inclined ring $f$, of soft metal, such as lead. A correspondingly-inclined ring $g$, of soft metal, such as lead, is inserted between the outer part $d^4$ of the metal end piece or ferrule $d^3$ and the ring $e$. These rings $f$ and $g$ being in close contact with the expanded metal and when the lengths are put together being in close contact with each other give metallic continuity throughout the length of conduit, so as to constitute an earth-sheath, protecting from extraneous currents the cables or conductors in the conduit.

The invention may be applied to single-way conduits and to conduits with two or more ways in them.

When the form shown in Figs. 1, 2, and 3 is applied to conduits having two or more ways through them, the socket and spigot ends, with the lead or like rings $f$ and $g$, will be made of the flattened elliptical or other shape of the conduits with two or more ways, and metal end-pieces or ferrules can be formed with metal plates, as shown at $d^5$ $d^6$ in Figs. 4, 5, and 6, (which are drawn to a smaller scale,) the said plates having formed in them openings of the same bore as the ways in the conduits and with outwardly-curved portions at $d^2$ and $d^4$ for the purpose aforesaid.

I claim as my invention—

Lengths of conduit for electric cables, the said lengths being made of combined open-work metal and cement-like material, with socket and spigot ends, and provided at each end of the way through them with internal metal end pieces or ferrules having outwardly-curved portions at the end, and with metal rings in contact with the ends of the open-work metal, and inclined rings of lead, or other soft metal, between the metal rings, and in contact with the open-work metal.

In testimony whereof I have signed this specification in the presence of two subscribing witnesses.

THOMAS EASTON DEVONSHIRE.

Witnesses:
I. W. HAMILTON,
T. G. MOWAR.